May 31, 1932.  C. E. CRAPO  1,860,385
LOCOMOTOR
Filed March 20, 1930   3 Sheets-Sheet 1
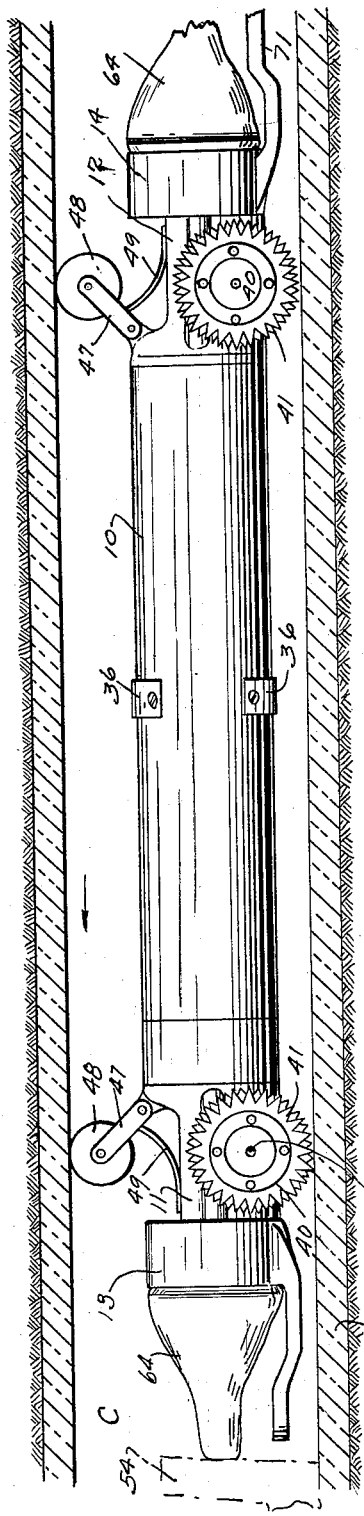
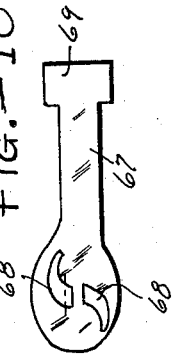
Inventor
Charles E. Crapo
By
Attorney May 31, 1932.    C. E. CRAPO    1,860,385
LOCOMOTOR
Filed March 20, 1930    3 Sheets-Sheet 2
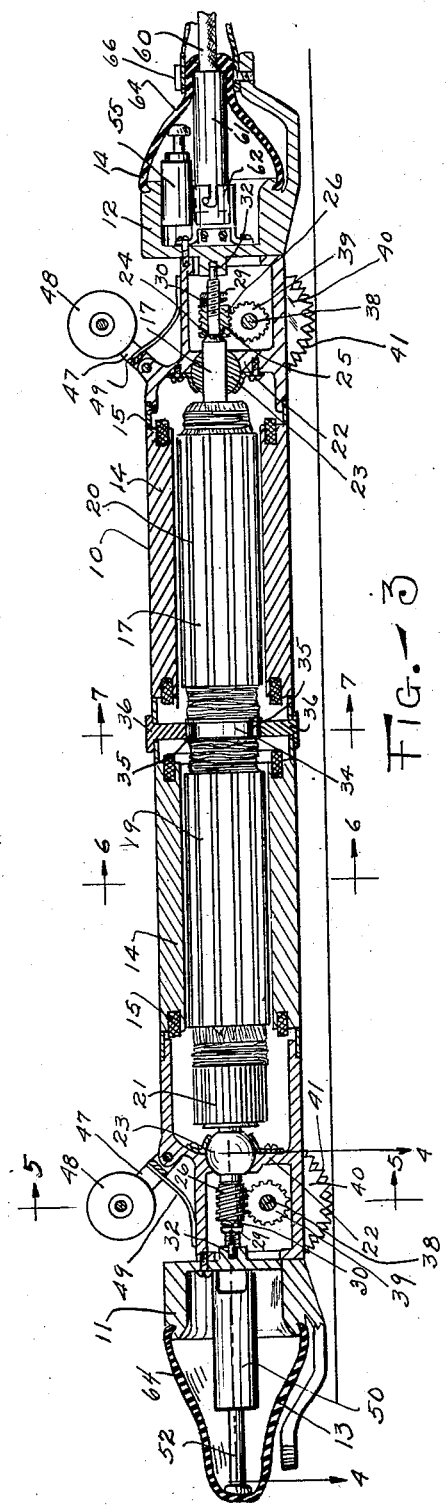
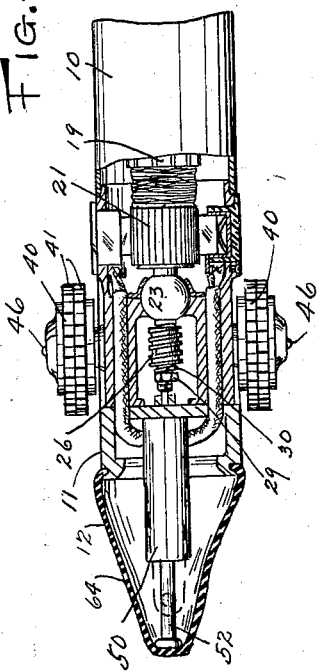
Inventor
Charles E. Crapo
By
Attorney May 31, 1932.  C. E. CRAPO  1,860,385
LOCOMOTOR
Filed March 20, 1930  3 Sheets-Sheet 3
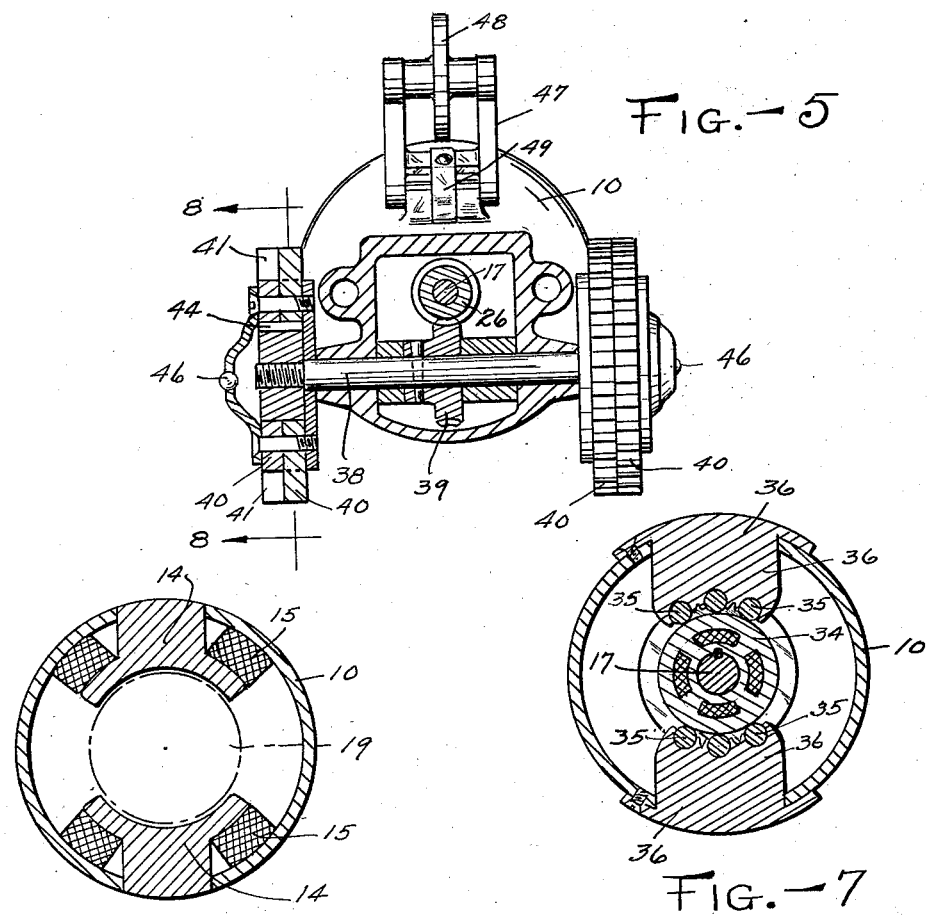
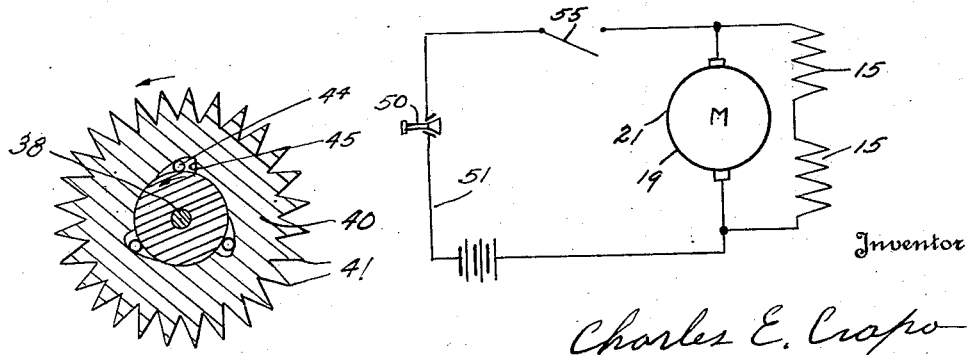
Inventor
Charles E. Crapo
By
Attorney Patented May 31, 1932

1,860,385

UNITED STATES PATENT OFFICE

CHARLES E. CRAPO, OF CLEVELAND, OHIO

LOCOMOTOR

Application filed March 20, 1930. Serial No. 437,336.

This invention relates to new and useful improvements in locomotors and more particularly to the type of locomotors designed for use in underground conduits, ducts and the like.

The object of this invention is to provide a locomotor especially adapted for travelling through underground conduits, such as are used for electric light and telephone cables, for the purpose of stringing or threading therethrough the small wire which is used as a tow line for the heavier wire by means of which the cable is drawn through the conduit.

As is well known to those acquainted with the art to which this invention relates the bores in the aforementioned conduits are comparatively small in cross section and the distance between the lateral inlets which give access to the conduits is on the average about five hundred feet. Therefore, a locomotor adaptable to the purpose set forth is limited to a comparatively small over-all cross sectional area and must be able to develop a relatively high power efficiency. The armature of the propelling motor will have to be relatively small in cross section and, if the regular practice in motor building is followed, the armature must be made excessively long to compensate for its small diameter, to meet the power requirements. Such an armature however can not be employed in a device of this character as the dimension limitations will not permit the providing of sufficiently stout supports, bearings and the like necessary to prevent an excessively long armature from buckling or otherwise changing its alignment relative to its field.

By my invention I have sought to provide a new and improved arrangement and construction of the motor with the object of securing the requisite power with a limited cross-sectional area of armature and field and to this end I have devised an armature arrangement which comprises a plurality of armature sections, said armature sections being spaced apart longitudinally on a single shaft and connected in parallel to a common commutator. In the spaces between the armature sections I have provided suitable bearings which by supporting the shaft at these points prevent the buckling of the armature.

In order to secure the most favorable traction conditions I provide the locomotor with spur wheels and further to secure increase traction efficiency I provide means of exerting a resilient pressure on the locomotor by means of spring tensioned idlers or rollers carried by the locomotor and arranged to act against the top surface of the bore of the conduit. I also provide a relief clutch on the motor shaft which operates when the motor is overloaded or when advance is interrupted with the current on. Also I provide an automatic switch arrangement which operates at a predetermined point at the end of the travel of the locomotor through the conduit. Also I provide rubber hoods or caps for closing the ends of the locomotor so as to make the same gas and water proof.

My invention also consists in certain other combinations and arrangements of parts which will be hereinafter set forth in the specification, particularly pointed out in the claims and illustrated in the accompanying drawings.

Referring to the accompanying drawings Fig. 1 is a longitudinal vertical section of a conduit showing my locomotor in side elevation. Fig. 2 is a detailed view showing a portion of one end of the locomotor. Fig. 3 is a central vertical sectional view of the locomotor. Fig. 4 is a section on line 4—4, Fig. 3. Fig. 5 is a section on line 5—5, Fig. 3. Fig. 6 is a section on line 6—6, Fig. 3. Fig. 7 is a section on line 7—7, Fig. 3. Fig. 8 is a section on line 8—8, Fig. 5. Fig. 9 is a diagram of the wiring. Fig. 10 is a view of the clamp for connecting the feed wire to the locomotor. Fig. 11 is a view of the clamping sleeve.

Again referring to the drawings $a$ indicates the conduit and $c$ is the bore or channel therein which is generally rectangular in cross section.

The locomotor consists of a hollow longitudinal carriage or frame which is in general cylindrical in form and for convenience of manufacture comprises a tubular body portion 10, a detachable neck portion at each end of the body portion, indicated at 11 and 12 and cup shaped head portions 13 and 14 carried by the neck portions.

The electric motor for propelling the device is arranged entirely within the tubular body portion 10 and completely fills the cavity or chamber therein. The field 14 and field windings 15 may be arranged on the interior wall of the body portion 10. The armature comprises a motor or armature shaft 17 which extends the full length of the body portion 10 and the neck portions 11 and 12, and the extreme ends thereof are screw threaded. On the armature shaft 17 are mounted spaced armature sections 19 and 20. These armature sections are constructed according to the regular practice but are quite small in diameter and relatively long. The commutator is shown at 21 and the armature sections are connected in parallel to said commutator.

Midway in the neck portions are provided bearings 22 carrying spherical shaped journals 23 for supporting the armature shaft 17 a little way back from its ends. The ends of said shaft, where they project beyond said journals 23 are reduced in diameter and the resulting shoulders 24 are given a conical shape to provide the male members of friction clutches. On each of the reduced end portions of the shaft 17 is mounted a worm 26, and the bore of said worm, as at 25, is formed conical adjacent to the conical shoulder 24 on the shaft 17 so as to form the female member of the friction clutch. Clamping nuts 29 are screwed on the ends of the shaft 17 and between each nut and the adjacent worm is a spring 30. By screwing up on the nuts 29 the desired tension can be secured for locking the clutch members together and securing the worms to the shaft, but making it possible for the worms to be disengaged from the shaft if the motor becomes overloaded. Small bearings 32 are provided for supporting the extreme ends of the motor shaft 17.

On the center of the shaft 17 between the armature sections is secured a journal 34 and this journal is supported on roller bearings 35 carried by supports 36 inserted through openings in the tubular body portion 10 and rigidly secured therein.

A shaft or axle 38 extends transversely beneath each worm 26 on the motor shaft 17 and on each axle is rigidly secured a worm gear 39 which meshes with said worm. The traction wheels are shown at 40 and the perimeters of said wheels are provided with teeth or spurs. These teeth or spurs may be arranged in double rows having a staggered relation to each other as shown at 41. The wheels are secured to the axles by the well known clutch arrangement involving balls 44 and cam slots 45. The hub caps of the wheels may be provided with balls 46 mounted after the manner of a ball-castor to reduce friction in case the hub comes into contact with the side walls of the conduit.

In order to make the traction of said wheels 40 more efficient the following arrangement is provided. On the top of the locomotor near each end is pivotally secured an arm 47, and each arm carries a wheeel or roller 48. A leaf spring 49 is secured to each arm 47 and the free end thereof rests on the surface of the locomotor. The arrangement is such that the spring will hold the said rollers 48 against the upper surface of the conduit and thereby exert a spring tension on the locomotor.

At the forward end of the locomotor I provide a switch 50 which is included in the circuit 51 which supplies the electricity to the motor. This switch 50 may be of any suitable construction and is designed to be operated by a rod 52, the pushing in of which will open the switch and the drawing out of the same will close the switch. The opening of this switch will be brought about automatically through the end of said rod coming into contact with a suitable bumper 54 arranged at a predetermined point near the end of the travel of the locomotor through the conduit. At the opposite end of the locomotor is a similar switch 55 which is designed to be manually operated.

The feed wire is shown at 60 and the end thereof is preferably provided with one member 61 of a quickly detachable clamp, the other member 62 of said clamp being arranged adjacent to the terminals of the motor. This clamping device may be in the form of the well known pin and bayonet slot arrangement.

Rubber caps 64 are provided for closing the ends of the locomotor to render the same gas and water proof, and said caps may be secured in position in any suitable way. In order to secure the neck of the cap tightly around the feed wire, I provide a sleeve 65 which carries lugs 66. A clamping member 67 is provided having cam slots 68 for engagement with the said lugs on the sleeve and by swinging or twisting the clamping member the sleeve is drawn tightly over the end of the cap and is then locked in position by bending down ears 69 around the wire. At the rear end of the locomotor an arm 71 is provided to which the tow line 72 may be attached.

What I claim is:

1. In a locomotor for conduits and the like, an elongated body portion provided with wheels, a motor within said body portion, and extending longitudinally thereof, the shaft of said motor being connected to said wheels, the said motor comprising a field and a plurality of spaced armature sections connected to a common commutator, each armature section functioning as an independent armature, and journals for supporting said motor shaft intermediate of said armature sections and at its ends.

2. In a locomotor for conduits and the like, an elongated body portion, a motor mounted within said body portion and extending longitudinally thereof, the motor comprising a field, a motor shaft, and a plurality of spaced armature sections on said shaft and connected to a common commutator, bearings for supporting the shaft intermediate of said armature sections, traction wheels operatively mounted on said body portion, the perimeter of said wheels being serrated to increase the tractive power thereof and means operatively connecting the wheels with the motor shaft.

3. A locomotor for conduits and the like comprising a body portion, traction wheels operatively mounted on said body portion, an electric motor mounted on said body portion for furnishing driving power, means for connecting the motor with the traction wheels, an electric circuit connecting said motor with a source of electricity and a switch arranged in said circuit, a rod for opening and closing said switch, and means for automatically operating said rod to open said switch when the locomotor approaches the end of its travel through a conduit.

4. A locomotor for conduits comprising an elongated hollow body portion, traction wheels operatively mounted on said body portion, an electric motor arranged entirely within said hollow body portion, means operatively connecting the shaft of said motor with the traction wheels, means for quickly attaching electric conductors to said motor, and means for preventing the entrance of air or water within said hollow body portion comprising rubber caps arranged over the ends of said hollow body portion and tightly engaging said conductors.

In testimony whereof I affix my signature.

CHARLES E. CRAPO.